United States Patent Office 3,260,059
Patented July 12, 1966

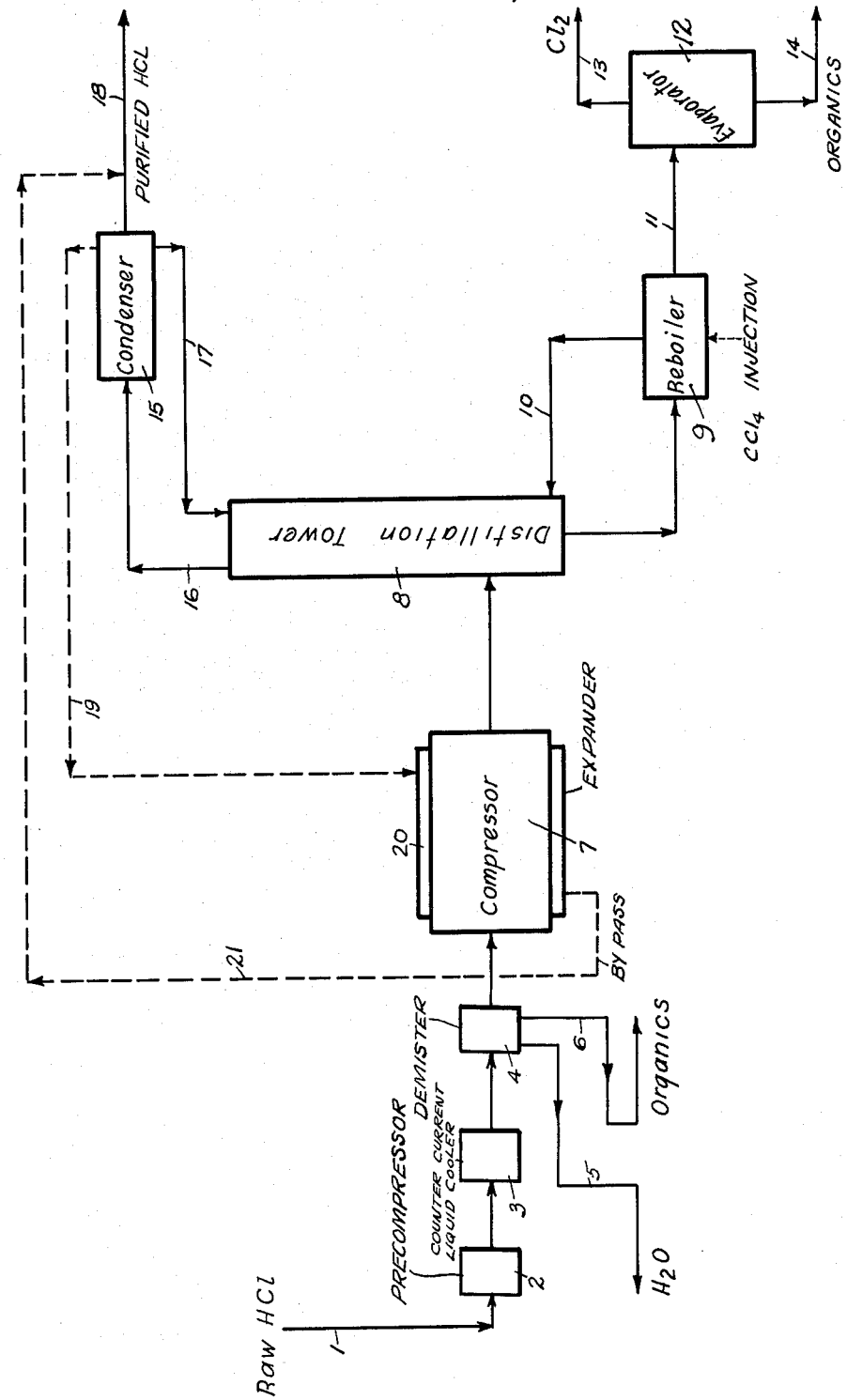

3,260,059
PURIFICATION OF HYDROGEN CHLORIDE
David S. Rosenberg and Edward A. Belmore, Niagara Falls, N.Y., assignors to Hooker Chemical Corporation, Niagara Falls, N.Y., a corporation of New York
Filed Oct. 21, 1963, Ser. No. 317,482
10 Claims. (Cl. 62—28)

This invention relates to a process for the treatment of gaseous hydrogen chloride and more particularly it relates to an improved process for the purification of gaseous hydrogen chloride.

Hydrogen chloride is an important industrial chemical used in the preparation of many useful materials, such as the vinyl chloride, neoprene, rubber hydrochloride, and the like. For many uses it is desirable that the hydrogen chloride is substantially free of contaminants, and particularly those which might have an adverse effect on the product prepared.

An important commercial source of hydrogen chloride is the by-product gas obtained from various chemical processes. For example, silicon and titanium dioxide can be made by hydrolysis of their respective tetrachlorides, with hydrogen chloride formed as a by-product. Similarly, and at the present time, perhaps the largest source of by-product hydrogen chloride are the off gases obtained from the substitutive chlorination of organic compounds.

Much of this by-product hydrogen chloride, as well as hydrogen chloride obtained by such processes as the direct combination of hydrogen and chlorine or by the reaction of sodium chloride with sulfuric acid, contains impurities which may be undesirable in manufacturing processes which employ the hydrogen chloride. In general, however, the most objectionable contaminants are those found in the off gases from organic chlorination processes. Although the process of this invention is particularly applicable to the purification of by-product hydrogen chloride from such organic chlorinations, it should not be construed as being limited to these applications and can be employed for the purification of impure hydrogen chloride from many sources. For the sake of convenience, however, the process of the present invention will be described hereinafter with particular reference to by-product hydrogen chloride obtained from organic chlorinations.

Many organic chlorinations require an excess of chlorine in order to secure an adequate rate of reaction or the desired type and extent of conversion. This excess chlorine often appears in the off gases with the hydrogen chloride. In addition, these chlorination off gases may also contain varying amounts of organic contaminants, depending on the particular process under consideration. Chlorine is an objectionable contaminant in many processes employing hydrogen chloride because it is corrosive, toxic, and functions as an oxidizing agent. The organic compounds are undesirable because they may contaminate the final product or impart to it objectionable odor or toxicity. Accordingly, the specifications on the purity of hydrogen chloride employed in chemical synthesis have become increasingly high and inflexible, resulting in a need for improved methods for purifying hydrogen chloride.

In the past, many attempts have been made to solve the problem of purifying hydrogen chloride, and in particular by-product hydrogen chloride, but none of these has been completely successful from a practical and economical standpoint. One method which has been employed is the absorption of the hydrogen chloride in water to form muriatic acid. This absorption is not, however, completely selective, and the muriatic acid thus produced may contain various amounts of dissolved impurities. In the case of chlorination off gases, these impurities may include dissolved chlorine and organic contaminants. Although the chlorine concentration in the thus-produced muriatic acid can be reduced to low levels by air blowing or boiling the solution, both of these procedures are troublesome and require the use of expensive, corrosion-resistant equipment. Additionally, appreciable quantities of the hydrogen chloride may also be driven off with the chlorine. Moreover, only minor amounts of the organic contaminants are generally removed by these procedures, so that an additional treatment is required for substantially complete removal, such as adsorption by activated carbon, which treatment is both troublesome and expensive. Accordingly, and further in view of the fact that this method does not produce an anhydrous hydrogen chloride, which has greater utility, this method has not generally proved to be satisfactory.

It will be appreciated that the term "muriatic acid" as employed herein is intended to refer to an aqueous solution of hydrogen chloride. Additionally, the term "hydrogen chloride" is intended to refer to an essentially anhydrous material, either as a gas or a liquid, which may contain organic or inorganic contaminants including minor amounts of water.

Another procedure for obtaining a high purity anhydrous hydrogen chloride involves the desorption of HCl from a purified muriatic acid solution containing more than about 20 percent hydrogen chloride. In this method, the muriatic acid solution is heated and hydrogen chloride gas is driven off until the concentration of the solution approaches 20 percent HCl, which is the concentration of the constant boiling mixture. The spent muriatic acid is then returned to an absorption system to be enriched with hydrogen chloride, thus completing the cycle. Although systems of this type are in operation, generally, they are bulky and complicated. Moreover, the evolved hydrogen chloride gas contains water which must be removed, as by condensation or absorption, to obtain the desired anhydrous product. Accordingly, in this method large investments and costly acid-resistant tanks, pumps, absorbers, stills, and other auxiliary equipment, which are expensive to maintain and operate, are required.

Other procedures have been suggested wherein organic solvents rather than water are employed as the absorbing medium. In these systems, the impurities are absorbed preferentially in the organic solvent, leaving a purified HCl gas. Such methods have the drawback, however, of requiring the pumping, boiling, condensing, cooling, and storage of large quantities of relatively expensive solvents. Moreover, corrosive amounts of muriatic acid tend to form and accumulate in the system, unless extreme care is taken to exclude water from the system and to provide for the purging of corrosive materials.

Other systems using solid adsorbents to remove the impurities in the hydrogen chloride have also been suggested. In these, however, unless the amounts of such impurities in the by-product gas are quite low, the large quantities of adsorbent required make such systems too expensive for general use. Although regeneration of the adsorbent may be employed to reduce the cost, this adds greatly to the complexity of the process, making it very troublesome to operate. Accordingly, such methods are generally only economical to use for removing the final traces of contaminants from hydrogen chloride which has been purified previously by some less expensive means.

Thus, until the present time, there has been an unfilled need for a simple, compact, and economical system that will produce purified, anhydrous hydrogen chloride, particularly from by-product gases, and which can use equipment made from inexpensive and readily available materials of construction. This need is filled by the process of the present invention, which process can be used to purify hydrogen chloride obtained from many sources.

The drawing which is attached hereto and forms a part hereof is a schematic flow diagram of one embodiment of the improved hydrogen chloride purification process of the present invention.

In the improved purification process of the present invention, hydrogen chloride gas containing condensable and/or liquefiable impurities, such as water and reactive organic and inorganic compounds, is treated to remove substantially all of the water from the HCl gas and at least that portion of the organic and inorganic compounds which will solidify upon the subsequent compression of the HCl gas to a liquefaction pressure. The thus-treated gas is then compressed to a suitable liquefaction pressure, desirably at least about three atmospheres and is introduced into a fractionation zone, wherein it is countercurrently contacted with liquid hydrogen chloride while reflux conditions are maintained within the fractionation zone. A liquid fraction containing impurities having a higher boiling point than HCl is removed substantially continuously from the lower portion of the fractionation zone and a purified hydrogen chloride product, substantially free of higher boiling impurities, is recovered from the upper portion of the zone. The purified hydrogen chloride product may be recovered either as a gas or it may be liquefied or condensed. The liquefaction of the hydrogen chloride product may be desirable to provide further purification of the hydrogen chloride gas, as for example where appreciable quantities of non-condensable impurities and/or impurities having a boiling point below that of hydrogen chloride are present.

Exemplary of the contaminants, but by no means all inclusive thereof, which may be separated from HCl gas by the process of the present invention are water; chlorine; halogenated lower aliphatics such as carbon tetrachloride, trichloroethylene, hexachloroethane, pentachloroethane, perchloroethylene, hexachlorobutadiene, as well as other halogenated analogs; halogenated alicyclics, such as hexachlorocyclopentadiene, octachlorocyclopentene and the like; aromatics, such as hexachlorobenzene; inorganics, such as nickel chloride, iron chloride, titanium tetrachloride, silicon tetrachloride and other metallic halides, and the like. Additionally, the present process has been found to be particularly applicable to the purification of by-product HCl obtained from fluorination processes for the production of mixed fluoro-chloro compounds. Because of the HF contained in this by-product HCl, it has been found that the present process is substantially the only commercially practical one to separate the HF and HCl.

More specifically, the method of the present invention involves the following processing steps: (1) pretreatment of the raw HCl gas to remove water and other impurities which may detrimentally affect the remainder of the purification of the process; (2) compression of the partially purified HCl to liquefaction pressure; and (3) fractional distillation of the compressed HCl to obtain a purified HCl product. Considering first the pretreatment processing step, as has been indicated hereinabove, hydrogen chloride, and particularly by-product hydrogen chloride, may contain impurities such as water and reactive and/or solid organic and/or inorganic compounds which must be removed, or at least reduced to minimum levels before the remaining two processing steps of the present invention may be effected. It is to be noted that where the only contaminant present in the hydrogen chloride in appreciable quantities is chlorine, no pre-treatment of the hydrogen chloride may be required before compression and fractionation. As will be pointed out in more detail hereinafter, however, the presence of chlorine does limit the maximum temperature allowable in any portion of the system to about 150 degrees centigrade, at least if mild steel is to be used as the principal material of construction for the components of the system. In this regard, it is to be noted that one significant advantage of the present process is that mild steel can be used as the material of construction for substantially all the components of the system, in contrast to the prior art processes which required the use of expensive and frequently fragile materials of construction in order to withstand the corrosive condition encountered in such prior methods.

It has been found that one of the most objectionable contaminants in the hydrogen chloride, as least insofar as its detrimental effect on steel equipment is concerned, is water. Accordingly, it is important that prior to compression to the liquefaction pressure, the hydrogen chloride gas is treated so as to reduce the water content thereof to a maximum concentration of about 100 p.p.m. and preferably less than 50 p.p.m. Many suitable methods for effecting this desired water removal from this hydrogen chloride gas will be apparent to those in the art. For example, the hydrogen chloride gas may be brought into contact with a solid adsorbent, such as silica gel, alumina gel, a molecular sieve, and the like, to effect water removal. As such adsorbents become saturated with the water removed from the HCl gas, they may be reactivated by heating, and thereby may be reused for many cycles. In another method, the hydrogen chloride gas is contacted with a chemical reactant which will combine with the water. Typical reactants are those which form a hydrate, such as sulfuric acid, calcium chloride, and the like, or a reactant may be used which forms an inoffensive by-product with the water, such reactants including acid chlorides, thionyl chlorides and the like. Where reactants are used which form a hydrate, these may be reactivated by heating, in a similar manner to the solid adsorbent. Where the reactants used are those which form inoffensive by-products, the by-products formed may be discarded.

As a further alternative, water in the hydrogen chloride may be removed by cooling the gas to form a condensed aqueous phase which is then separated from the gaseous HCl. Various methods for effecting the desired cooling of the gas may be used, including many direct and indirect contact heat exchange techniques. Inasmuch as the temperature to which the hydrogen chloride is cooled will depend, in part at least, upon the pressure at which the gas is handled, it may be desirable to carry out the cooling of the gas under pressure, e.g., from about 1 to about 4 atmospheres. This not only makes it possible to condense the water impurities in the HCl at a higher temperature, thus reducing the amount of refrigeration equipment required, but also provides an initial compression stage for the hydrogen chloride which is ultimately to be compressed to the liquefaction pressure. The condensed water in the HCl gas may then be removed by various methods, as for example, by electrostatic precipitation, by passing the gas through a demister, or the like.

As has been indicated hereinabove, organic and inorganic impurities, other than water, may also be removed from the hydrogen chloride in this pretreatment operation. Generally, it is desirable to remove substantially all of the organic or inorganic impurities which may form solids in the subsequent compressor system and which may also have a detrimental effect on the subsequent purification operations. Removal of the organic substituents may be accomplished by cooling the HCl gas so as to condense the impurities and thereafter, separating the condensed material from the gas. In some instances, it has been found desirable in removing these organic and inorganic materials to scrub the hydrogen chloride gas with a high boiling scrubbing liquid, such as the high boiling organic compounds. In these instances, it has been found that the beneficial effects of cooling and scrubbing may be realized by utilizing a chilled or cooled scrubbing liquid.

The preferred method of removing both organic and inorganic impurities, including water, in the gas pretreating step, is by cooling of the gas to condense the impurities with subsequent removal of these condensed impurities, preferably by passing the gas through a demister.

Inasmuch as this method is applicable to removal of both water and organic and inorganic impurities, it is generally desirable that the removal of these impurities be carried out simultaneously, in a single condensation and de-misting operation, rather than sequentially. In this manner, the number of separate operations to be carried out in the pretreatment portion of the process is reduced, with the consequent simplification of the process and reduction in cost.

In carrying out the preferred pretreatment operation of the present invention, the raw HCl gas, contain minor amounts of organic impurities such as carbon tetrachloride, trichloroethylene, perchloroethylene, hexachlorobutadiene, hexachlorocyclopentadiene, octachlorocyclopentene, hexachlorobenzene, hexachloroethane, pentachloroethane, inorganic substances, such as chlorine, aluminum and magnesium silicates, metallic halides, such as the metallic chlorides, and the like, is introduced into a compressor wherein it is compressed to a pressure within the range of about 15 to about 60 p.s.i.g. Preferably, the gas is compressed to a pressure within the range of about 30 to about 45 p.s.i.g., e.g., 35 to 40 p.s.i.g. For this compression, many different types of compressors have been found to be suitable For example, excellent results have been obtained when using a compressor of the Nash turbine type. When using such a compressor, however, it is desirable that the sealing liquid used not be one which will add contaminants to the HCl gas being compressed. Although many different sealing liquids may be used, concentrated sulfuric acid has been found to be particularly suitable in that not only does it not add contaminants to the HCl gas but, additionally, it acts as a drying agent to aid in the removal of any water vapor which is present in the gas. It will, of course, be appreciated that other sealing liquids may be used in the Nash turbine type compressor or that compressors other than the Nash turbine type may be used.

The thus compressed HCl gas, still under the pressures as indicated hereinabove, is then cooled sufficiently to effect condensation of a major amount of the impurities in the HCl gas, other than chlorine. Generally, the gas is cooled to a temperature within the range of about 10 to about −10 degrees centigrade. In this regard, it has been found to be desirable that the gas is not cooled to a temperature substantially less than about −15 degrees centigrade as, in some instances, plugging of the apparatus has been experienced when such extremely low temperatures are used. It is believed that some of this plugging may be attributed to the formation of a solid hydrogen chloride hydrate which forms at temperatures below about −15 degrees centigrade. Accordingly, it is preferred that the HCl gas be cooled to a temperature within the range of about 0 to about −10 degrees centigrade.

This cooling may be effected using various methods. For example, indirect heat exchange methods may be used wherein the gas is passed in contact with a cooled surface, such as cooling coils through which a cooling media is circulated. Alternatively, the compressed, raw hydrogen chloride gas may be cooled by direct contact refrigeration cooling, as for example, by passing it through a packed tower in countercurrent contact with a liquid cooling media. Many different types of cooling media may be utilized, provided they do not contaminate the hydrogen chloride gas with which they are in contact. For example, high boiling organic materials, such as those which are condensed from the hydrogen chloride gas stream being treated, may be cooled by many convenient means, as for example by passing them in contact with a refrigeration coil, and thereafter brought into countercurrent contact with the HCl gas stream to be purified to effect cooling thereof and condensation of the impurities in the gas stream. In this manner, or by using other equivalent cooling techniques, substantially all of the water and high boiling organic impurities as well as a large portion of the lower boiling organic impurities and the inorganic impurities are condensed or solidified in the gas stream in the form of a mist.

Once the impurity mist has been formed in the hydrogen chloride gas, the gas still under the pressure as indicated hereinabove, is subjected to further treatment to effect removal of the impurity mist from the gas. Here again, many different methods are suitable for effecting removal of the mist from the gas. For example, the hydrogen chloride gas containing the impurity mist may be passed through electrostatic precipitators; mechanical type de-misters, such as cyclones, impingement type de-misters, such as those utilizing mats or pads of various fibrous materials such as glass fibers, ceramic fibers, aluminum silicate fibers, metallic fibers, plastic fibers, and the like. For simplicity of operation, it has been found that the impurity mist in the HCl gas stream is preferably removed using an impingement type de-misting device, such as one using a filter pad of aluminum silicate fibers. By operating in this manner, the water content of the HCl gas being treated is reduced to below about 100 parts per million, and generally below about 50 parts per million on a volume basis. Additionally, substantial amounts of the high boiling organic impurities, such as the chlorinated butadienes, cyclopentadienes, cyclopentenes, benzenes, and the like, are also removed. Although appreciable quantities of some low boiling organic materials, such as trichloroethylene, perchloroethylene, carbon tetrachloride, chloroform, and the like, may also be removed, as will be pointed out in more detail hereinafter, it is desirable that at least some of these organic materials remain in the gas, as their presence has been found to give beneficial effects during the subsequent gas treatment. Accordingly, it has been found to be desirable that the HCl gas obtained from the partial compression, cooling and demisting operation contain such lower boiling organic materials in amounts at least about twenty times the volume of any water remaining in the gas, e.g., about 0.1 percent by weight of the HCl gas. Appreciably higher amounts of these low boiling organic materials may be present in the composition, for example, amounts as high as about 5 percent by weight of the HCl gas. In view of the desirable effects obtained when such quantities of these low boiling organic substituents are present in the HCl gas during the subsequent treatments, where the gas does not contain these organic materials in at least the minimum amount of about 0.1 percent by weight, it may be desirable to add such materials to the gas prior to subsequent purification treatments.

Once the aforedescribed pre-treatment operation has been completed, the gas is compressed to a suitable liquefaction pressure, preferably within the range of about 3 to about 30 atmospheres, with the range of about 15 to about 20 atmospheres being the most preferred. As has been indicated hereinabove, it is desirable that the temperature of the hydrogen chloride gas not exceed about 150 degrees centigrade and preferably be less than about 130 degrees centigrade during the entire purification process. Inasmuch as appreciable heat is imparted to the gas during the compression thereof, it is desirable that the gas temperature at the time the compression is initiated be as low as possible in order to minimize, so far as possible, the amount of cooling required during the compression operation. Accordingly, it is preferred that the temperature of the HCl gas, at the time the compression is initiated, be not substantially in excess of the gas temperature at the time of condensing and demisting operation, i.e., about 0 degrees centigrade. It will be appreciated, however, that such low temperatures of the gas at the beginning of the compression step are not essential and appreciably higher temperatures than 0 degrees centigrade, e.g., temperatures as high as 20 to 30 degrees centigrade or even higher may be utilized so long as sufficient cooling of the gas during compression is supplied so as to maintain the gas at a temperature which is preferably below about 150 degrees centigrade and preferably below 130 degrees centigrade.

With regard to the compression method and apparatuses used, it will be appreciated that these may be of various suitable types. For example, the compressor may be a reciprocating, centrifugal, radial compressor or the like, the particular design used depending on the scale of operation, the pressure desired and other related factors. Preferably, and particularly where the pressure to which the gas is compressed is within the range of about 15 to 20 atmospheres, a reciprocating compressor may be used. It should have a sufficient number of compression stages, with inter-stage cooling so as to maintain the gas below the maximum temperature limit. Generally, it has been found that satisfactory results are obtained utilizing a two stage compressor wherein the gas is compressed from about 35 to about 110 p.s.i.g. in the first stage and up to about 260 p.s.i.g. in the second stage. With such a compressor, cooling of the gas may be achieved using many different types of cooling apparatus, as for example, a shell and tube intercooler, or the like. In one specific embodiment of the method of the present invention, it has been found to be desirable to effect cooling of the gas after the second compression stage by indirect contact of the gas with the expanded purified HCl product gas utilizing a shell and tube type heat exchanger.

With regard to the maximum gas temperature, particularly in the compression portion of the process, as has been indicated hereinabove, the HCl gas is maintained at a temperature below about 150 degrees and preferably below about 130 degrees centigrade. At gas temperatures substantially in excess of these values, it has been found that there is appreciable corrosion of the eqipment, particularly where it is made of steel. Thus, by maintaining the gas temperatures below the maximum, the less costly steel equipment may be utilized without being subject to excessive corrosion or attack by the chlorine in the HCl gas undergoing the treatment. Additionally, it has been found that at higher gas temperatures, thermal chlorination of many organic impurities in the HCl gas, occur. The materials formed by such thermal chlorination may be solid or high boiling liquids which may deposit or condense in the compressor system.

Once the HCl gas has been compressed to the desired liquefaction pressure, e.g., 15 to 20 atmospheres, it is subjected to fractionation, e.g., fractional distillation, under pressure. It will be appreciated that the compressed HCl gas may be introduced directly into a fractionating column, or if desired, it may be partially or completely condensed and introduced into the column as a liquid or as a mixed vapor-liquid.

In this fractional distillation step, the hydrogen chloride gas under pressure is introduced into the fractionating column and is countercurrently contacted with liquid hydrogen chloride. The amount of such liquid hydrogen chloride with which the hydrogen chloride gas in the fractionating column is contacted will be at least that amount which is sufficient to provide for refluxing in the distillation column. Most conveniently, the liquid HCl for such refluxing may be obtained by condensing at least a part of the purified product HCl obtained from the process and returning the thus-condensed portion to the fractionation zone. Alternatively, of course, liquid HCl from many other sources may be used.

The fractionation zone or distillation column used may be of many and various designs, provided it has a sufficient number of transfer units or plates to effect the desired fractionation and purification of the hydrogen chloride gas. Inasmuch as the temperatures of the gas being treated are maintained below that point wherein appreciable chlorine corrosion of the apparatus is obtained, the column may be constructed of mild steel or a low alloy steel. With such materials of construction, a simple tray column has been found satisfactory to meet the requirements of the process and provide the desired flexibility and operating conditions.

In general, the number of transfer units or theoretical plates needed in the column will depend on the nature and concentration of the impurities in the HCl gas being treated, the purity desired in the HCl product, the nature of the bottoms or liquid stream to be discharged from the column, and the like. Inasmuch as chlorine and all of the chlorinated organic and chlorinated inorganic compounds have boiling temperatures above that of liquid hydrogen chloride, these impurities are removed with the bottoms product of the fractional distillation column. Additionally, if the hydrogen chloride removed as the overhead product of the column contains non-condensibles such as nitrogen, oxygen, hydrogen, or the like, subsequent liquefication of the purified hydrogen chloride will provide for separation of these materials.

As the hydrogen chloride gas is introduced into the fractionation column and reflux conditions are maintained in the fractionation zone of the column, there is obtained in the lower portion of the fractionation zone or column a liquid portion which contains substantially all of the impurities in the hydrogen chloride gas. Generally, it has been found to be desirable to provide the distillation or fractionating tower with a heating means or reboiler into which the liquid portion or bottoms from the fractionating column are substantially continuously introduced. Within the heater or reboiler, this liquid portion is at least partially vaporized and the vapor reintroduced into the fractionation or distillation column and passed upwardly therethrough in the same manner as the hydrogen chloride gas which is introduced into the column. In this way, a more complete separation of the hydrogen chloride gas and the impurities contained therein is obtained and there is found to be very little loss of the hydrogen chloride from the system, with a consequent realization of higher operating efficiencies.

As has been noted hereinabove, it has been found to be desirable that the amount of the liquid organic materials obtained in the lower portion of the fractionation zone and passed into the reboiler section be at least about 0.1 percent by weight of the hydrogen chloride gas under treatment and preferably be within the range of about 0.2 to about 5 percent by weight of the hydrogen chloride gas. This portion of liquid materials obtained from the lower portion of the fractionating zone has been found to function as a purge which is effective in removing some of the impurities which may not have been completely removed in the pretreating portion of the process, particularly water. As has been indicated, it may be desirable to add some lower boiling point chlorinated organic materials, such as carbon tetrachloride, trichloroethylene, perchloroethylene, or the like, to the heating zone or reboiler where the amount of liquids introduced into the reboiler from the distillation column is not at least about 0.1 percent by weight of the HCl gas under treatment.

From the reboiler portion of the fractionation equipment the liquid mixture of chlorine and organic materials may, if desired, be discarded. Alternatively, the chlorine may be stripped from the organic compounds in the mixture in a second or auxiliary column or evaporator. Generally, where this is done, the organic portion obtained may be discarded. If desired, the chlorine stripped from the organic materials may be reintroduced into the chlorine feed stream for the organic chlorination reaction from which the by-product impure hydrogen chloride is obtained.

In subjecting the hydrogen chloride gas, introduced into the fractionation zone, to reflux conditions by passing it countercurrent to a stream of liquid hydrogen chloride, there is obtained in the upper portion of the fractionation zone or distillation tower a highly purified hydrogen chloride gas. This HCl gas is found to contain no more than about 50 parts per million water, less than about 1 percent chlorine (from 1 percent to 20 percent of that originally present), less than about 100 p.p.m. organic impurities and not more than about 50 p.p.m. inorganic impurities.

By using additional plates the chlorine content may be decreased even further, to less than about 100 parts per million. It has been found that substantially the only contaminant which may be present in the impure hydrogen chloride gas which is treated, which is not removed by the process of the present invention is carbon dioxide. Generally, this material co-distills with the hydrogen chloride in the fractionation zone and, hence, is not removed. Ordinarily, however, carbon dioxide is normally present only in minor amounts and is generally considered to be a relatively inoffensive impurity in the hydrogen chloride gas.

As mentioned earlier, the purified hydrogen chloride product gas obtained from the top of the fractionation zone may, if desired, be at least partially condensed to provide the liquid hydrogen chloride required for the reflux in the fractionating column. Although in some instances, all of the purified gaseous hydrogen chloride may be condensed as for example, where a liquid product is desired, or separation of non-condensibles is desired, the amount of gaseous HCl which is condensed is generally only that which is required for reflux, the remainder being taken off as the gaseous product. The weight ratio of the reflux to the gaseous product may be within the range of about 0.1:1 to about 5:1, although often ratios used may be outside these ranges, depending upon the specific operating conditions encountered.

After the partial condensation of the purified HCl gas, the remaining uncondensed gas, still under a pressure preferably within the range of about 15 to about 20 atmospheres, is recovered as the purified product and may then be utilized in many industrial processes. Preferably, however, before the product gas is collected, it passed, still under pressure, to the compressor where it is permitted to expand and take up heat, thereby providing cooling for the by-product impure HCl gas which is undergoing compression.

Referring now to the drawing, the single figure shows a schematic diagram of a preferred embodiment of the process of the present invention. As shown in this drawing, the raw hydrogen chloride, containing various impurities previously mentioned, is subjected to a pretreatment wherein substantially all the water, as well as appreciable quantities of organic impurities, are removed from the hydrogen chloride. The raw HCl gas is introduced through conduit 1 into a precompressor 2 wherein there is a partial compression of the HCl gas to a pressure within the range of about 1 to about 4 atmospheres. The compressed gas is then passed into a cooler 3 wherein it is cooled to condense the water and other impurities therein and to form a mist in the HCl gas. Thereafter, the mist is preferably separated by passing the gas through an impingement type de-mister 4, from which the water and organics are removed through conduits 5 and 6. Following the pretreatment, the HCl gas is then passed through a compressor 7 wherein it is further compressed, preferably to a pressure within the range of about 3 or 4 to about 30 atmospheres. The thus-compressed gas, is then passed into a distillation tower 8 wherein fractionation under reflux conditions is carried out while still maintaining the gas under pressure. The distillation tower is provided with a reboiler 9 into which the liquid portion or bottoms from the distillation zone are introduced, heated to effect at least partial vaporization, and returns to the distillation tower 8 through conduit 10. The unvaporized portion is taken through conduit 11 to an evaporator 12 wherein the chlorine is stripped from the organic portion of the material and removed through conduits 13 and 14. The distillation or fractionation tower is also provided with a condenser 15, through which at least a portion of the product, purified HCl gas, may be passed through conduit 16 so as to provide sufficient liquid HCl as needed for the reflux in the tower, the reflux liquid being returned to the tower 8, from the condenser 15, through conduit 17. The remaining HCl gas is then recovered as a purified gaseous product through conduit 18. Alternatively, as is shown by the dotted lines, the gaseous product, still under pressure may be returned to the compressor, 7, through by-pass conduit 19 wherein it is permitted to expand in the expander 20, preferably in indirect contact with the gas in the compressor, so as to provide cooling for the gas which is being compressed. This cooling effect of the compressed product gas may be utilized at any portion of the compression, e.g., before or after the compression or for inter-stage cooling. After expansion, the purified HCl gas is then removed from the expander 20, through by-pass conduit 21, and returned to conduit 18 from which it is recovered as the gaseous product of the present process.

In summary, the apparatus utilized for the practice of the process of the present invention comprises (1) a suitable pretreater and dryer to remove objectionable water and organic impurities from the raw HCl gas, (2) a compressor, and (3) a fractionating column provided with a reboiler and condenser, which condenser provides liquid HCl reflux for the column. Additionally, where it is desired to provide for substantially automatic and continuous operation of the process, there will also be provided suitable automatic control instrumentation as is required for a smooth, continuous operation.

EXAMPLE

Illustrative of the present process is the following actual operating example in which a by-product hydrogen chloride obtained from the chlorination of pentane was purified. The contaminants in this material were found to have the following average composition:

Non-condensible gases ($CO_2$, $O_2$, $H_2$ and $N_2$) _____ less than about 0.5 percent by volume.

Water _____ 0.015–0.25 percent by weight.

Organic constituents:
    Carbon tetrachloride __ 0.25 to 2.05 percent by weight.
    Tetrachloroethylene ___ 0 to 1.0 percent by weight.

Lesser amounts of trichloroethylene, hexachlorocyclopentadiene, and octachlorocyclopentene were also present. A stream of this by-product gas was introduced into the pretreating portion of the process as has been described hereinabove. This portion of the process included a Nash type turbine wherein the gas was compressed to about 35 lbs./sq. inch gauge and a scrubbing tower through which the compressed gas was passed and scrubbed countercurrently with a stream of hexachlorobutadiene maintained at a temperature within the range of about −10 to 0 degrees centigrade. Thereafter, the gas was passed through an impingement type de-mister, which utilizes a filter pad of aluminum silicate fibers. The thus-treated gas was then compressed in a three stage compressor to an operating pressure of about 250 lbs./sq. inch gauge. Interstage cooling was provided on the compressor to remove the heat of compression and to keep the maximum temperature of the gas below about 130 degrees centigrade. The cooling of the gas after the final compression stage was obtained by indirect contact between the compressed gas and the expanding product gas obtained from the process.

The compressed gas, at a temperature of about 25 to 30 degrees centigrade was then fed into a selected plate of a 12 plate steel fractionating column, of the bubble plate type. The operation of the column, under steady conditions was carried out for a period of about 16 hours, after which a series of samples was collected to measure the efficiency of the HCl purification. A summary of the results obtained from five such tests is given below in the following table.

*Table.—Fractionation of liquid hydrogen chloride*

| Test Number | 1 | 2 | 3 | 4 | 5 |
|---|---|---|---|---|---|
| Chlorine in feed—wt. percent | 2.9 | 9.7 | 4.9 | 1.0 | 2.9 |
| Feed (plate location) [1] | 9 | 5 | 5 | 3 | 2 [2] |
| Gas feed rate—lbs./hour | 100 | 134 | 93 | 96 | 125 |
| Liquid HCl reflux—lbs./hr. | 71 | 76 | 118 | 98 | 86 |
| Product gas removed—lbs./hour | 97 | 117 | 97 | 95 | 85 |
| Chlorine in product gas—wt. percent | 0.640 | 0.775 | 0.262 | 0.200 | 0.040 |
| Organics in product—wt. percent | 0.0086 | 0.0100 | 0.0104 | 0.0156 | |
| Chlorine in bottoms $\left(\dfrac{Cl_2}{Cl_2+HCl}\text{---wt. percent}\right)$ | 76 | 73.5 | 80 | 80 | 15 |
| Organics in bottoms [3] | | | | | |

[1] Above numbered plate, counting upward from the bottom of the twelve plate column.
[2] Feed introduced below bottom plate—reboiler not heated.
[3] Throughout the period of operation of this unit the entire amount of organic materials being discharged from the bottom of the column was stripped free of chlorine and HCl in an auxiliary column, weighed, collected in suitable batches and analyzed.

The quantity amounted to two to three percent of the weight of the gas fed and it consisted of about forty to sixty percent $CCl_4$; fifteen to forty percent $C_2Cl_6$; zero to twenty-six percent each of $C_2Cl_4$ and $C_2HCl_3$ and minor amounts of $C_4Cl_6$ from the scrubbing liquid. Some chlorination of the $C_2Cl_4$ (to $C_2Cl_6$) and $C_2HCl_3$ (to $C_2HCl_5$) occurred in the compressor and column.

By these results it is seen that by the method of the present invention an extremely efficient separation of gaseous hydrogen chloride and the impurities contained therein is obtained and a highly purified HCl product is produced. It will be appreciated, of course, that the fractionation portion of the process need not be carried out in a bubble plate column inasmuch as a suitable separation and fractionation may also be obtained using other packed columns, sieve plate columns and the like.

Even more improved separations, to chlorine contents less than 100 p.p.m., for example, are obtained when more plates are used in the column.

EXAMPLE 2

The procedure of Example 1 was repeated using a by-product hydrogen chloride from the chlorination of pentane which contained about 17.1 percent by weight chlorine, less than about 1 percent by weight non-condensibles ($CO_2$, $O_2$, $N_2$ and $H_2$), and about 4.2 percent by weight chlorinated organic compounds, including carbon tetrachloride, trichloroethylene, tetrachloroethylene, pentachloroethane, hexachloroethane, hexachlorocyclopentadiene, octachlorocyclopentene, and the like.

This gas was introduced into the pretreating portion of the process at a flow rate of about 2577 pounds per hour, (2263 lbs./hour HCl, 181 lbs./ hour $Cl_2$, 108 lbs./hour organics about 25 lbs./hour non-condensibles). The gas was compressed from about 10 pounds per square inch gauge to about 35 pounds per square inch gauge, and then passed upwardly through a packed scrubber-chiller wherein it was countercurrently scrubbed with an organic liquid previously condensed from a by-product hydrogen chloride gas stream. The gas, at a temperature of about −10 degrees centigrade was then passed through a de-mister as in Example 1, and then into a two stage compressor. Within the compressor, the gas pressure was raised from about 35 to about 120 pounds per square inch, gauge in the first stage and from about 120 to about 250 pounds per square inch, gauge in the second stage. Inter-stage cooling was provided and the compressed gas obtained from the second stage was cooled to about 10 degrees centigrade by passing through a heat exchanger cooled by the expanding purified product gas, as in Example 1.

The thus-compressed and cooled gas was introduced into the vapor space above the fourth plate of a 22 plate bubble plate fractionation column, constructed of mild steel. The hydrogen chloride gas was passed upwardly through the column in countercurrent contact with a liquid hydrogen chloride reflux, provided at the rate of about 2850 lbs./hour by condensing, at about −13 degrees centigrade, a portion of the purified anhydrous product gas obtained from the top of the column. This product gas, which was obtained at the rate of about 2250 lbs./hour, after removal of the portion for condensing as reflux was found to contain only about 140 parts per million, by weight, $Cl_2$, less than 100 parts per million, by weight organics and less than about 1 percent by weight non-condensibles. This purified product hydrogen chloride, at a pressure of about 250 pounds per square inch, gauge, was then passed to the heat exchanger for the second compressor stage where it was throttled to about 50 pounds per square inch, gauge, to provide cooling for the compressed gas from the compressor. Thereafter, the purified hydrogen chloride was available as the product of the process. Alternatively, of course, the purified gas at 250 pounds per square inch gauge could be condensed to effect removal of substantially all the non-condensible contaminants and then recovered as a purified anhydrous liquid hydrogen chloride. The bottoms obtained from the fractionation column were throttled to about 50 pounds per square inch gauge and then passed through an evaporator or stripper to separate $Cl_2$. The vapors from the evaporator were found to contain about 88 percent by volume $Cl_2$ and about 6 percent by weight chloroform.

A corresponding satisfactory separation is made when the HCl charged includes about 1–25 percent HF, as is obtained as a by-product of the fluorination of chlorinated hydrocarbons in the manufacture of fluorochlorohydrocarbons such as the Freons.

While there have been described various embodiments of the invention, the compositions, methods, and apparatus described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A method of purifying hydrogen chloride gas containing water and organic and/or inorganic contaminants, which comprises removing from the hydrogen chloride gas substantially all of the water and solidifiable organic and/or inorganic contaminants by compressing the hydrogen chloride gas containing these impurities to a pressure within the range of about 1 to about 4 atmospheres, cooling the thus-compressed gas to a temperature not substantially below about −10° centigrade, whereby the water and substantial amounts of the organic and/or inorganic contaminants are condensed to form a mist in the gas, thereafter, separating the mist from the gas, compressing the thus-treated gas to a suitable liquefaction pressure of at least about 4 atmospheres, introducing the thus-compressed gas under pressure into a fractionation zone, countercurrently contacting the gas within the fractionation zone with liquid hydrogen chloride, maintaining reflux conditions within the fractionation zone, forming a liquid fraction containing the contaminants having a higher boiling point than hydrogen chloride, which fraction is removed substantially continuously from a lower portion of the fractionation zone, and forming a purified hydrogen chloride product, substantially free of higher boiling impurities, which product is recovered from an upper portion of the fractionation zone.

2. The process as claimed in claim 1 wherein the temperature of the hydrogen chloride gas is maintained below about 150 degrees centigrade.

3. The method as claimed in claim 2 wherein the hydrogen chloride gas temperature is not substantially in excess of about 130 degrees centigrade throughout the entire process.

4. The method as claimed in claim 3 wherein the separation of the mist from the gas is accomplished by passing the gas through an impingement type mist separator.

5. A method of purifying hydrogen chloride gas containing water, chlorine and organic and inorganic contaminants, which comprises compressing the gas to a pressure within the range of about 1 to about 4 atmospheres, passing the thus-compressed gas in countercurrent contact with a liquid cooling media, whereby the gas is cooled to a temperature within the range of about −10 to about 0 degrees centigrade and substantial quantities of the water, organic and inorganic impurities are condensed in the gas stream, passing the thus-cooled hydrogen chloride gas through an impingement type mist separator to remove substantially all of the condensed contaminants from the gas to produce a hydrogen chloride gas containing less than about 100 p.p.m. water, compressing the thus-obtained hydrogen chloride gas to a liquefaction pressure within the range of about 4 to about 30 atmospheres, while maintaining the temperature of the gas during the compression below about 150 degrees centigrade, introducing the thus-compressed gas under pressure into a fractionating zone, effecting a countercurrent contact between the gas introduced into the zone and liquid hydrogen chloride while maintaining reflux conditions within the fractionating zone, obtaining a liquid fraction in the lower portion of the fractionating zone which contains substantially all of the contaminants having a higher boiling point than hydrogen chloride, vaporizing at least a portion of the thus-obtained liquid fraction and passing the thus-obtained vapor through the fractionating zone concurrently with the hydrogen chloride gas, and recovering from the upper portion of the fractionating zone a purified hydrogen chloride product which is substantially free of impurities having a boiling point higher than hydrogen chloride.

6. The method as claimed in claim 5 wherein the liquefaction pressure to which the gas is compressed is within the range of about 15 to about 20 atmospheres.

7. The method as claimed in claim 5 wherein the liquid hydrogen chloride passed countercurrent to the hydrogen chloride gas in the fractionation zone is obtained by condensing at least a portion of the purified hydrogen chloride product obtained from the fractionation zone.

8. The method as claimed in claim 5 wherein the organic content of the compressed hydrogen chloride gas is adjusted to within the range of about 0.1 to about 5 percent by weight of the hydrogen chloride gas, prior to the introduction of the compressed gas into the fractionation zone.

9. The method as claimed in claim 5 wherein the purified hydrogen chloride product, under pressure, is expanded in indirect contact with the hydrogen chloride gas undergoing compression so as to provide cooling thereof to maintain the temperature of the compressed gas below about 130 degrees centigrade.

10. The method as claimed in claim 1 wherein the hydrogen chloride gas which is treated contains hydrogen fluoride as a contaminant.

References Cited by the Examiner
UNITED STATES PATENTS

| | | | |
|---|---|---|---|
| 2,402,978 | 7/1946 | Allen | 23—154 |
| 2,507,605 | 5/1950 | Lopker. | |
| 2,665,240 | 1/1954 | Brumbaugh | 202—51 |
| 2,841,243 | 7/1958 | Hooker | 23—154 X |
| 2,901,407 | 8/1959 | Colton | 23—154 X |
| 3,077,082 | 2/1963 | Adams | 62—9 X |

NORMAN YUDKOFF, *Primary Examiner.*

V. W. PRETKA, J. JOHNSON, *Assistant Examiners.*